Jan. 26, 1943.   C. N. PADEN   2,309,353
COMBINATION PLANTER AND FERTILIZER DISTRIBUTOR
Filed Jan. 6, 1939   4 Sheets-Sheet 1
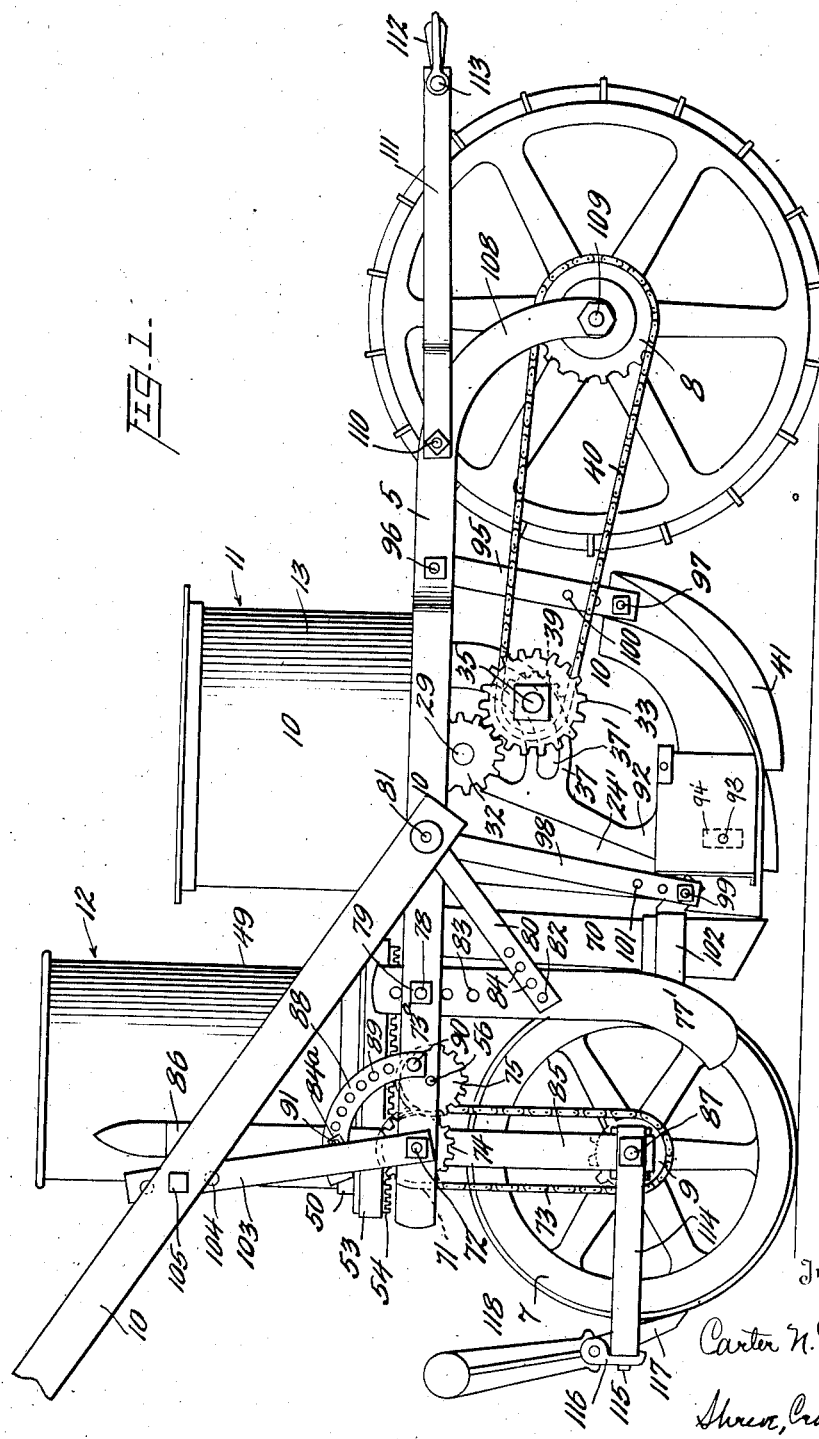

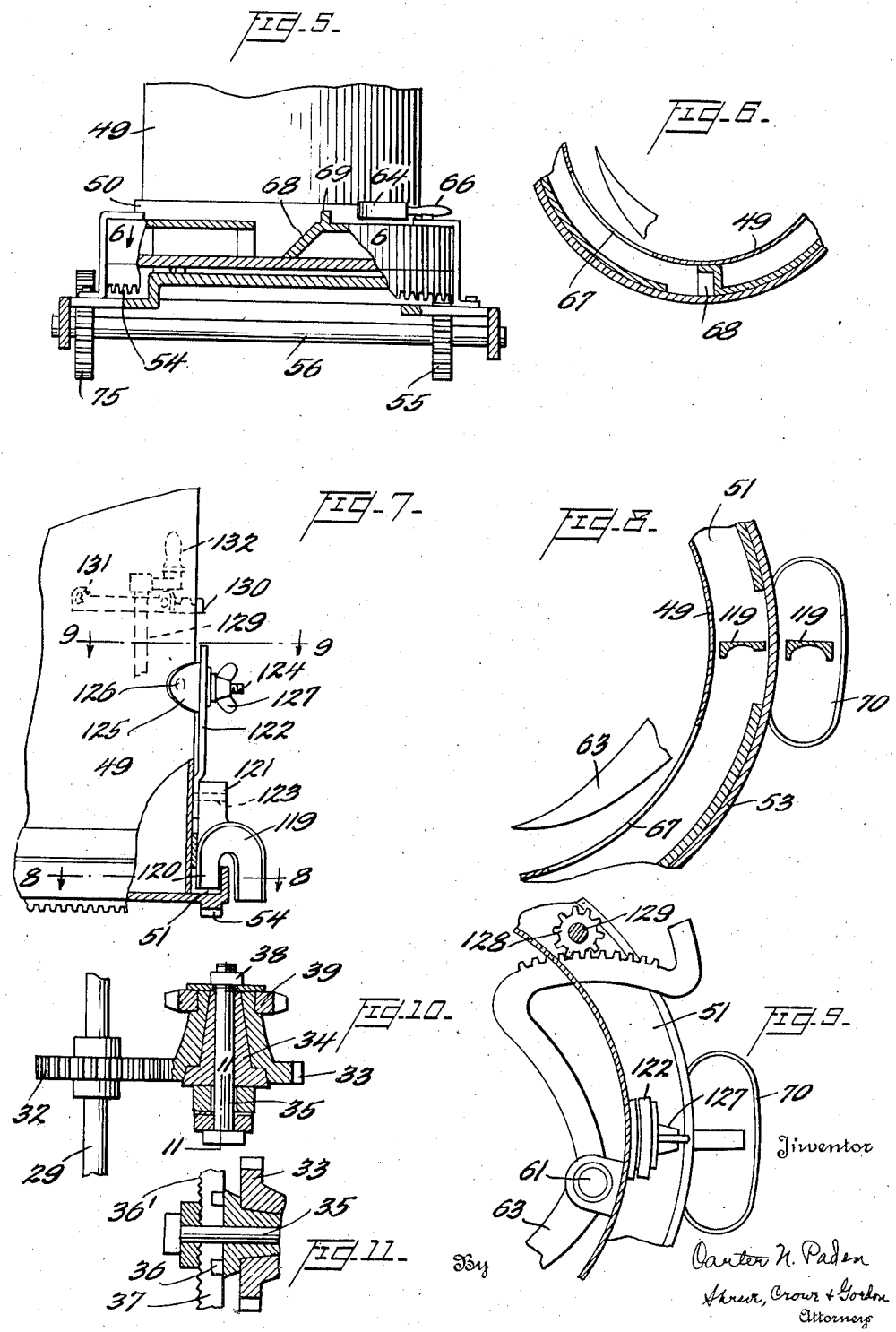

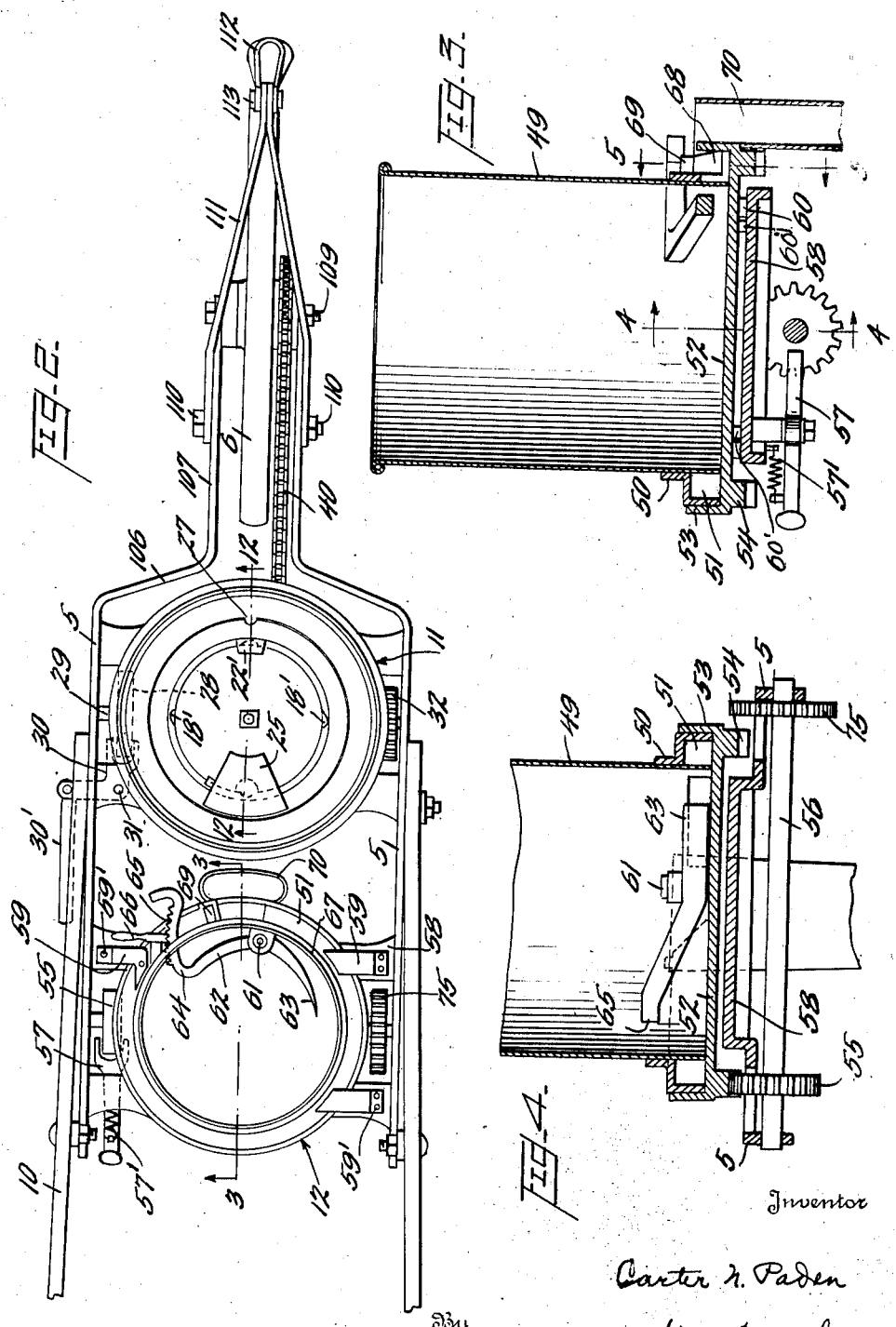

Jan. 26, 1943.   C. N. PADEN   2,309,353
COMBINATION PLANTER AND FERTILIZER DISTRIBUTOR
Filed Jan. 6, 1939   4 Sheets-Sheet 4
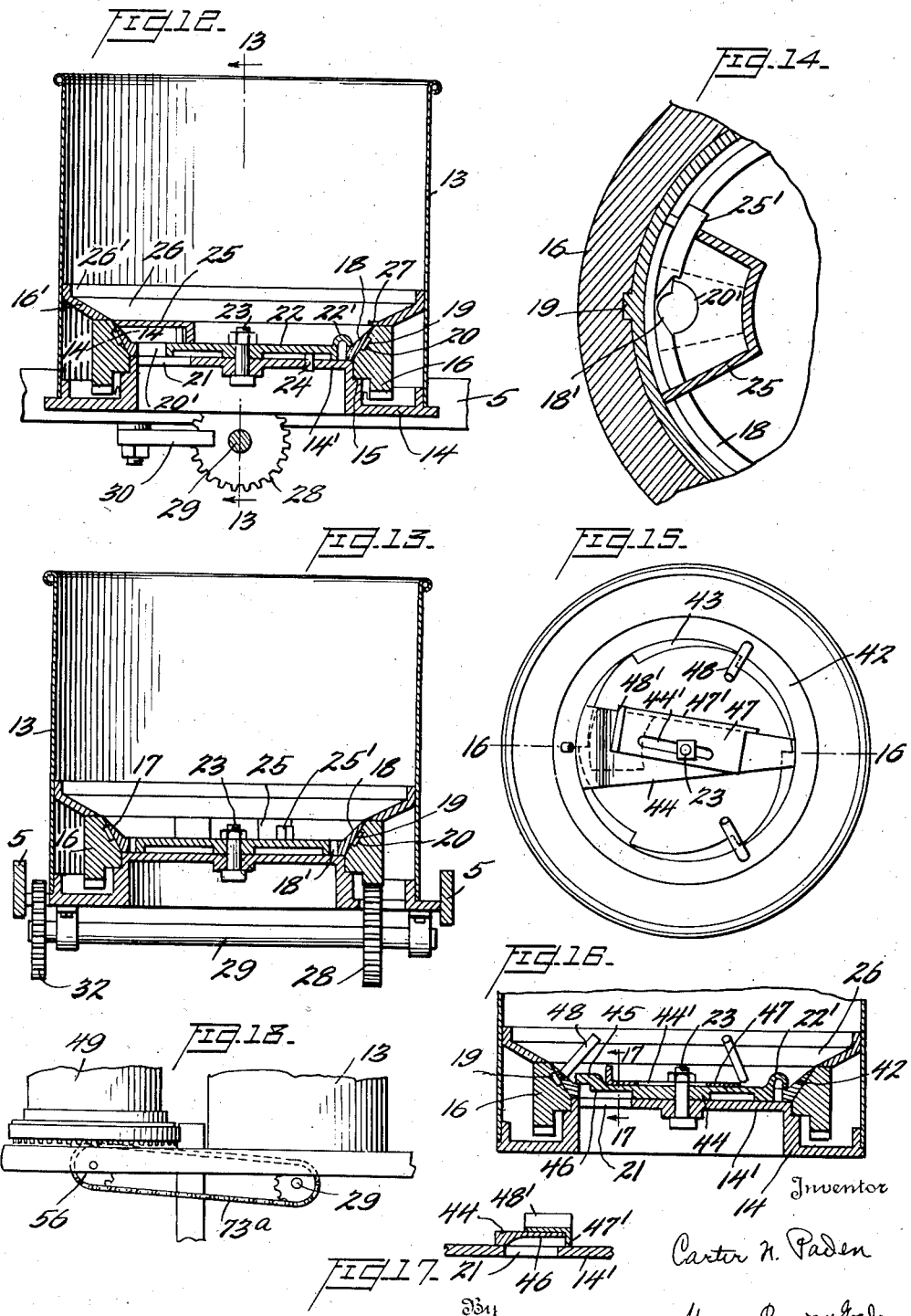

Patented Jan. 26, 1943

2,309,353

UNITED STATES PATENT OFFICE 2,309,353

COMBINATION PLANTER AND FERTILIZER DISTRIBUTOR

Carter N. Paden, Atlanta, Ga.

Application January 6, 1939, Serial No. 249,652

4 Claims. (Cl. 111—35)

Generically this invention relates to planters but it is more particularly directed to a combination seed and fertilizer distributor and comprising a compact and efficient device.

One of the principal objects of this invention is the provision of the gearing arrangement and mounting intermediate the drive wheel sprocket and the seed distributing mechanism wherein the speed of said mechanism may be varied and the tensioning of the drive belt or chain effected without altering the length of the chain or disturbing the mesh of the driving gears.

Another important object of this invention is the provision of a discharge tube from the seed hopper so designed as not to interfere with the travel of the seed from the hopper to the furrow irrespective of the forward movement of the machine, and compact arrangement of a fertilizer hopper and discharge tube with respect to said seed hopper and its distributing tube whereby fertilizer is delivered to the furrow substantially coincident with the delivery of the seed.

Another important object of this invention is to provide an adjustable mechanism interior of the hopper and coacting with a conduit extending circumferentially of the hopper whereby to direct a regulated amount of the contents of the hopper through an opening in the wall of the latter and into the said conduit.

Another object of this invention is to provide a baffle arrangement in connection with the discharge chute conduit extending circumferentially of the fertilizer hopper whereby the baffle arrangement may be adjusted to vary the rate of flow from said conduit into the discharge spout.

Another important object of this invention is the provision of means in connection with the fertilizer distributing mechanism for elevating the fertilizer for discharge from the hopper and an elevating mechanism adjustable exterior of the hopper for utilization under certain conditions in lieu of said first mentioned elevating mechanism.

Still another important object of this invention is the provision of means for effecting a positive control of the fertilizer feed from the hopper adjustable exterior of said hopper.

Another object of this invention is the provision of an interchangeable form of adjustable seed ring especially adapted for distributing seed such as cotton seed and the like.

Other and important objects of the invention will be apparent during the course of the following description, reference being had to the accompanying drawings, wherein:

Fig. 1 is a side elevation of a machine embodying the invention.

Fig. 2 is a plan view with a portion of the handles, and the rear wheel and associated parts removed.

Fig. 3 is a vertical section on line 3—3 of Fig. 2.

Fig. 4 is a fragmentary section on line 4—4 of Fig. 3.

Fig. 5 is a fragmentary section on line 5—5 of Fig. 3.

Fig. 6 is a fragmentary horizontal section on line 6—6 of Fig. 5, illustrating one manner of fertilizer discharge.

Fig. 7 is a fragmentary side elevation of one form of fertilizer discharge, partly in section.

Fig. 8 is a horizontal section on line 8—8 of Fig. 7.

Fig. 9 is a section on line 9—9 of Fig. 7 illustrating one form of control means for the fertilizer discharge.

Fig. 10 is a detail section through a sprocket and associated elements.

Fig. 11 is a section on line 11—11 of Fig. 10.

Fig. 12 is a vertical section through the seed hopper taken on line 12—12 of Fig. 2.

Fig. 13 is a section on line 13—13 of Fig. 12.

Fig. 14 is a section on line 14—14 of Fig. 12.

Fig. 15 is a plan view of one form of seed hopper and distributing mechanism.

Fig. 16 is a section on line 16—16 of Fig. 15.

Fig. 17 is a detail section on line 17—17 of Fig. 16.

Fig. 18 is a modified form of sprocket drive for the fertilizer distributor.

In the accompanying drawings wherein like numerals refer to like parts throughout, 5 designates the main frame of the machine supported upon front and rear ground wheels 6 and 7, said wheel 7 preferably being of the split type. The wheel 6 carries sprocket 8 adapted to drive the seed mechanism, to be described, while the wheel 7 carries a sprocket 9 adapted to in turn drive the fertilizer distributor, to be described. Adjustable handles 10 are suitably attached to the frame 5.

Referring particularly to Figs. 1 and 2, the numerals 11 and 12 indicate generally the seed hopper and fertilizer hopper, respectively. The seed hopper comprises a cylindrical casing 13 rigidly supported upon a base member 14. Rotatively mounted upon a shoulder 15 of the member 14 is a ring gear 16 having an inclined inner face 17. The member 14 has a central raised portion 14' forming a bottom for the hopper 13 and is rigidly supported by the frame members 5. A seed ring 18 of generally conical shape is mounted upon the inclined face 17 of the ring gear and is held for rotative movement with the ring gear by lugs 19 engaging in sockets 20 of the ring gear. The seed ring 18 has a plurality of pockets 18' formed in its lower edge adapted to receive the seeds and conduct them to the discharge opening 21 formed in the raised or bottom portion 14' of member 14. A plate 22 is rigidly mounted upon the portion 14' through the medium of a bolt 23 and lug 24. This plate 22 has a single cut-out opening 20' formed in its peripheral edge and directly positioned over the discharge opening 21, such peripheral cut-out coacting with the respective seed ring pockets 18' to enable the seed to be readily released into a discharge seed chute 24'. A guard member 25 is positioned over the discharge opening 21 to prevent the discharge of any seed other than those carried around by the seed ring.

Extending beneath guard 25 in the path of and overlying seed pockets 18' is a spring control member 25' adapted to release pressure should a pocket 18' become too crowded with seed, thereby not only assisting in effecting uniform discharge of the seed, but preventing crushing thereof at point of discharge through opening 21, as will be apparent without further discussion.

Mounted within hopper 13 is an annular ring 26 having a vertical flange 26' corresponding in dimension to the interior dimension of said hopper and having an inclined face portion 16' adapted to seat on and hold down ring gear 16, and which is provided with a lip or lug 27 overlying the upper edge of seed ring 18 to prevent displacement thereof.

Means are provided to drive the ring gear 16, comprising a spur gear 28 suitably splined upon a shaft 29. A yoke 30 pivoted at 31 to the frame 5 and connected to handle mechanism 30', which may extend to a point in easy reach of the operator, serves to shift the gear 28 into and out of engagement with the teeth of the ring gear 16. A spur gear 32 fixed upon the shaft 29 is engaged by a spur gear 33 rotatably mounted upon a spindle 34, in turn mounted upon a stub shaft 35. The spindle 34 is provided with lugs 36 adapted to engage in an arcuate slot 37' formed in a guide bracket 37 having a serrated outer face 36'. A clamping nut 38 serves to rigidly fix the position of the spindle 34 within the slot. Fixed upon the hub of the gear 33 is a sprocket wheel 39 engaged and driven by a sprocket chain 40 from the sprocket 8. The particular arrangement of the driving gears 32 and 33 and the arrangement of the mounting of 33 and drive sprocket 39 is such as to enable the use of varying sizes of sprockets 39, said assembly being secured in slot 37' for changing the speed of the seed distributing mechanism and adjusting the driving chain or belt 40 without disturbing the mesh of the driving gears or changing the length of the belt, it only being necessary to release the clamp nut 38 to move the gear assembly 33 around the arcuate slot 37' of the bracket 37, it being understood that the slot is on the arc of the gear 32.

As shown in Fig. 1, the discharge spout 24' is of substantially conical formation and is arranged with its discharge end inclined toward the rear of the machine. The purpose of this arrangement is to permit the seed to pass entirely therethrough without touching the walls of the spout or chute, it being assumed that the machine is moving forward at a rate of speed equal to the time the seed takes to pass through the spout in a vertical line.

A furrow opener or shoe 41 is adjustably mounted in advance of the discharge spout 24'.

The operation of the seed hopper is as follows:

Assuming the machine to be moving forward, power is imparted to the shaft 29 and through the medium of the gear 28 the ring gear is rotated. Since the seed ring travels with the ring gear, seed dropping into the pockets 18' will be carried around until the pocket of the seed ring and the opening of the plate 22 register, at which time the seed will drop into the spout 24' and be discharged into the furrow. As before pointed out, the speed of the machine or distributing mechanism may be varied by changing the size of sprocket 39, the gears 32 and 33 remaining in mesh at all times. The guard plate 25 will prevent any seed entering the spout other than those carried around by the seed ring.

Referring to Figs. 15 and 16, a modified form of seed hopper mechanism is illustrated, comprising the same ring gear 16, base member 14, and inclined apron 26. A modified form of seed ring 42 is employed having tapering cut-outs 43 for forming seed pockets in conjunction with plate 44 that is fixed upon the base member 14. The plate 44 has a raised lip portion 45 at one end provided with a seed opening 46 arranged over the discharge port 21, and is formed at its opposite or narrow end with a U-shaped lip 22', said lips being adapted to engage the upper edge of ring 42 to prevent its displacement, similar to the seed ring heretofore described. A gate member 47 is adjustably mounted on plate 44 and is formed with a central slot 44' and a depending flange 47' overlying one edge of plate 44, said plate 44 and slot 47 are secured on member 14 by bolt 23, said slot permitting adjustment of said gate by handle 48' to vary said opening 46 as desired. Agitator fingers 48 are carried by the seed ring and are angularly arranged so that seed carried in the hopper 13 will be prevented from packing. The particular structure just described is adapted for use where it is desired to distribute large seed, such as cotton seed, the arrangement being such that the seed will be continuously agitated and caused to fall into the larger pockets whence they are delivered to the discharge port 21, thence to the discharge chute.

Attention is now directed to the structure of the fertilizer distributor 12. This structure embodies a cylindrical hopper 49, the lower end of which is supported upon a stationary annular, ring-like member 50. The member 50 is partly spaced from the wall of the hopper 49, forming an annular channel 51. The lower edge of the hopper 49 and member 50 rest upon a plate 52 having an annular upstanding flange 53 of a height substantially that of the channel 51. A ring gear 54 is formed upon the bottom of the plate 52 and is engaged and rotated by a gear 55 splined upon a shaft 56. The gear 55 is shifted into and out of engagement with the ring gear 54 by a yoke lever 57. The yoke lever 57 is provided with a post center mechanism 57' whereby the gear will be positively maintained in either position upon movement of said post in the desired direction. The plate 52 is rotatably mounted on a base plate 58, in turn rigidly supported by the frame members 5. The annular member 50 is supported by plates 59 suitably secured thereto and to the base plate 58 by bolts or other fastening elements 59'. Lugs 60 carried by the plate 52 and the adjacent and inwardly positioned lugs 60' carried by plate 58 prevent displacement of the plate 52 with respect to the plate 53.

Pivotally arranged within the hopper 49 as at 61 is a guide arm or member 62 having an arcuate leading point 63 and a curved substantially right angularly arranged adjustment arm 64 having ratchet teeth 65. A movable latch element 66 suitably mounted exterior of hopper 49 normally engages the teeth 65 for maintaining the point 63 in a particular adjustment for directing the contents from the hopper. As clearly shown, the member 62 is pivotally supported and rests substantially upon the plate 52 with the leading point adjustable toward and from the wall of the hopper. The arm 64 projects through an opening formed in the wall of the hopper, so that an adjustment of the arm 62 is made exteriorly of the hopper.

As clearly shown in Figs. 4 and 6, an elongated opening 67 is formed in the hopper 49 adjacent the bottom and in alignment with the point 63. The opening 67 communicates with the channel 51. Arranged within the channel, and preferably forming a part of the member 50, is an inclined surface 68 extending through an opening in the upper horizontal surface of the member 50. The inclined surface 68 terminates adjacent a baffle 69 arranged transversely of the member 50. A discharge chute 70 is suitably mounted in a position adjacent the baffle 69. Means are employed to drive the shaft 56, comprising a sprocket 71 rotatable upon a stub shaft 72 carried by the frame 5. The sprocket 71 is driven from the sprocket 9 through the medium of a sprocket chain 73. A spur gear 74 rotatable with the shaft 72 is in constant mesh with a spur gear 75 fixed upon the shaft 56. Thus it will be seen that movement of the wheel 7 will be imparted to the shaft 56. An alternate means of driving the shaft 56 is illustrated in Fig. 13, whereby a sprocket mechanism is employed to drive the shaft 56 from the shaft 29 by chain 73a.

The operation of the fertilizer distributor so far described is as follows:

Assuming the machine to be travelling forward, movement is imparted to the shaft 56, and, if the gear 55 is in mesh with the ring gear 54, the plate 52 is caused to rotate, the hopper and annular member 50 being held stationary. Fertilizer or other material within the hopper will be carried around in a circular movement, with a portion thereof constantly being forced behind the leading arm 63, whence it is forced out through the opening 67 traversing the channel 51 until it strikes the inclined surface 68. Continued pressure forces the material up the incline where it strikes against the baffle 69, at which time it works outwardly and drops into the spout 70.

Spoon coverers 77' are mounted rearward of the spout or chute 70 on bolts 78 extending through frame members 5, secured by nuts 79 and by brace members 80 having one end secured to frame members 5 by bolts 81, the other ends of members 80 being secured to coverers 77' by bolts 82. A series of perforations 83 at the upper ends of said covers and a similar series 84 at the lower ends of members 80 permit forward, backward and vertical adjustment of said covers as desired.

A pair of vertical standards 85 are secured for rotative adjustment on the outer ends of shaft 72 carried by frame members 5, one of said members extending upwardly and constituting lever element 86. Journaled between said members 85 on shaft 87 is the rear or split wheel 7.

Segmental member 88 formed with perforations 89 has its lower end secured to frame member 5 by bolt or other fastening element 90 adjacent shaft 56 and its upper end suitably secured to member 50. Lever 86 is rigidly secured in adjusted position by bolt or pin 91 extending through selected perforations 89 and said lever. Removal of pin 91 and movement of said lever 86 along the segment effects rotation of the standards on shaft 72 and moves wheel 7 rearwardly and forwardly to vary the furrowing depth of shoe 41.

The frame structure includes a casting 92 suitably supported by said frame in which is formed the said seed chute 24' and is formed with the arcuate interchangeable gear supporting bracket member 37, said chute underlying opening 21 in hopper 13. On the bottom of this casting 92 is mounted the furrow opener 41 by bolt 93 extending through slot 94 of the casting. The front end of said furrow opener is attached to frame 5 by link 95 secured by bolts 96 and 97 respectively, and the rear end of said opener is secured to said frame by link 98 secured by bolts 81 and 99 respectively, and in order to effect front and rear adjustment of said opener 41 said link 95 is formed with a series of perforations 100 and link 98 with perforations 101, bolt 99 also securing fertilizer chute 70 by brace member 102. The handles 10 by which the machine is guided are attached to frame 5 by bolts 81 and are adjustably supported on braces 103, which are formed with perforations 104 to effect such adjustment, the lower ends of said braces being connected to the frame 5 by shaft 72 and the upper ends by bolts 105 engaging certain of said perforations.

It might be well to state that the supporting frame members 5 extend inwardly adjacent seed hopper 13 as at 106 and outwardly as at 107 and downwardly as at 108, between which is mounted front drive wheel 6 on shaft 109 adapted to drive chain 40 by sprocket 8 as will be apparent. Attached to each of the frame members 5 by bolts 110 are the pull bars 111 forming a continuation of frame members 5 and converging at their free ends to which is attached clevis 112 by bolt 113.

Secured to the outer ends of shaft 87 is a substantially U-shaped bracket or brace member 114, and secured to said brace member by bolt 115 is a hinge bracket 116 to which is pivotally connected mud scraper 117 adapted to normally engage the tread of wheel 7 and terminating upwardly in counter-balance weight 118 as will be well understood.

Under certain operating conditions it is desirable to frequently vary the rate of flow of the fertilizer or contents discharged from channel 51 to discharge chute 70 and in which case the inclined surface 68 is omitted and an inverted U-shaped baffle 119 is provided, the normally inclined end 120 of which projects into the channel 51 and lies in the path of travel of the material leaving the hopper, the other end discharging into chute 70. As shown in Fig. 8, the baffle 119 is channeled in cross section causing the material impacting thereagainst to travel upward and over into the spout or chute 70. This baffle 119 is formed with a lug 121 having a suitable pivotal connection with a vertical rod 122 as at 123. Said rod 122 is slotted adjacent its upper end to receive bolt 124 formed with a base plate 125 secured to hopper 49 by rivet or other fastening element 126, said rod being adjustably secured by wing nut 127.

From the above it will be observed that movement of rod 122 permits baffle 119 to be rotated about its pivotal connection to change the inclination of the channel end 120 to vary the rate of flow of the hopper contents from channel 51 thereover as desired.

In some cases it may be desired to have the control of the fertilizer feed arm or gate 62 within easy reach of the operator and to more readily regulate the discharge of the contents from hopper 49, and in place of the movable latch 66, a pinion 128 engagable with ratchet teeth or rack 65 is mounted on the lower end of vertical rod 129 which extends upwardly through segmental rack 130 which is secured to hopper 49 by rivets or other fastening elements 131, and suitably mounted on the upper end of said rod 129 is a hand lever 132. It is apparent that movement of lever 132 over rack 130 causes pinion 128 to actuate member 62 moving point 63 toward or away from opening 67 thereby controlling the amount of discharge of the contents of the hopper through said opening as desired.

From the above it is apparent that I have designed a short-coupled compact combination planter and fertilizer distributor having means in ready access of the operator for easily effecting operative engagement and disengagement of the seed ring and fertilizer distributor; interchangeable means for varying the drive of the seed ring without changing the length of the drive chain, said chain being properly tensioned regardless of the size of the particular drive sprocket used; means adapted to positively control the fertilizer distributing means irrespective of rough or smooth terrain; means for controlling the fertilizer flow located conveniently and exteriorly of the fertilizer container; spring control means to prevent the seed ring from crushing the seed, respective seed and fertilizer distributing means adapted to be operated simultaneously or either one independently; no gears or chains overhanging the frame to become broken off or damaged during operation of the device, the latter of such construction that adjustments are quickly and easily made, or parts interchanged as becomes necessary for different sizes or types of seeds and with respect to varying the distributing rate of the seed ring, and at the same time providing a strong, durable device manufacturable at a reasonable cost and efficient for the purposes intended.

In conclusion, it is further emphasized that the respective seed rings are constructed with a plurality of pockets formed in the edge surrounding the central opening and, therefore, are not driven from the shaft or other means from the center of the ring as has been heretofore prevalent, but are carried by and rigidly connected with a ring gear 16 forming therewith a unitary structure driven from the outer rim instead of by other types of drives. This construction not only produces a better drive but permits the interchangeable seed rings to be simplified in structure by eliminating spokes and hubs, effecting a saving in cost of production, facilitating interchanging of the rings, and at the same time effecting a better feed without clogging, etc.

It is also to be understood that these rings may be constructed for intermittent or continuous seed flow as desired, and while preferably they have been described as being inclined, adapted to seat on the complemental surface of the ring gear, it is to be understood that the rings and ring gear may be constructed other than inclined so that said rings may be flat and adapted to lie in a horizontal plane, according to the exigencies of the particular requirements, as desired.

It will be further observed that the fertilizer regulating means is designed to deliver an exact predetermined and constant amount or flow of fertilizer to the chute, rather than largely depending on gravity feed as heretofore.

It will also be noted that the agitator fingers are attached to a horizontal rotating means and may be formed to lie in a horizontal, vertical, or other plane as desired rather than being fastened to a vertically disposed rotary means as in structures heretofore in use.

It will be further apparent that I have designed a unique means for accommodating different sized sprocket wheels for varying the speed of the seed ring structure, without removal of or requiring additional operation to effect tensioning of the drive belt or chain, thereby eliminating time and effort incident to effecting a change in speed of the seed distributing mechanism as heretofore necessary.

Although in practice it has been found that the form of the invention illustrated in the accompanying drawings and referred to in the above description as the preferred embodiment is the most efficient and practical, yet realizing that conditions concurrent with the adoption of the invention will necessarily vary, it is well to emphasize that various minor changes in details of construction, proportion, and arrangement of parts, may be resorted to within the scope of the appended claims without departing from or sacrificing any of the principles of this invention.

Having thus described the invention, what is desired protected by Letters Patent is as set forth in the following claims:

1. A planter comprising a wheel supported structure including a frame, a seed distributing means mounted on the frame including a driven gear, a casting operatively associated with the seed distributing means, the casting being cored and provided with an arcuate bracket, a furrow forming means adjustably connected to the casting, a gear assembly adjustably mounted in the bracket, said assembly including a gear in permanent mesh with said driven gear, a sprocket demountably associated with the permanently meshed gear, and means for adjusting said gear assembly in said bracket.

2. A planter comprising a wheel supported structure including a frame, a seed distributing means mounted on the frame including a driven gear, a casting cored to provide a seed chute carried by said frame and operatively associated with the seed distributing means, said casting supporting a furrow forming means adjustably connected thereto, and having a bracket for adjustably mounting a gear assembly, the latter including a gear in permanent mesh with said driven gear, a removable sprocket, and means for adjusting said assembly in said bracket, whereby said removable sprocket is interchangeable to vary the speed of the seed distributing means without affecting said meshing gears.

3. A planter comprising a wheel supported structure including a frame, a seed distributing means carried by the frame including a driven gear, a casting depending from said frame and formed with an integral bracket, a furrow forming means supported by and adjustably connected to the casting at its lower end, a gear assembly mounted in said bracket, including a gear in permanent mesh with said driven gear, a removable sprocket, a driving connection between a supporting wheel and the removable sprocket, and means for adjusting said assembly in said bracket, whereby said removable sprocket is interchangeable with different sized sprockets to vary the speed of said seed distributing means without affecting said meshing gears or said driving connection.

4. A planter comprising a wheel supported structure including a frame, a seed distributing means mounted on the frame including a driven gear, a casting operatively associated with the seed distributing means, the casting being cored and provided with an arcuate bracket, a furrow forming means adjustably connected to the lower end of and supported by said casting, a gear assembly adjustably mounted in the bracket, said assembly including a hub member having a gear at one end in permanent mesh with said driven gear and at its other end a removable sprocket, and means for adjusting said assembly in said bracket, whereby said removable sprocket is interchangeable with different sized sprockets to vary the speed of the seed distributing means without affecting said meshing gears.

CARTER N. PADEN.